(12) United States Patent
Nakayama

(10) Patent No.: US 7,031,289 B1
(45) Date of Patent: Apr. 18, 2006

(54) CONTROL OF AMPLITUDE LEVEL OF BASEBAND SIGNAL TO BE TRANSMITTED ON THE BASIS OF THE NUMBER OF TRANSMISSION CODES

(75) Inventor: Masahiko Nakayama, Tokyo (JP)

(73) Assignee: NEC Corporation, (JP)

( * ) Notice: Subject to any disclaimer, the term of this patent is extended or adjusted under 35 U.S.C. 154(b) by 0 days.

(21) Appl. No.: 09/464,520

(22) Filed: Dec. 15, 1999

(30) Foreign Application Priority Data

Dec. 17, 1998 (JP) ................... 10-359586

(51) Int. Cl.
*H04B 7/216* (2006.01)
(52) U.S. Cl. .............. 370/342; 370/208; 370/204; 370/329; 375/140; 375/143
(58) Field of Classification Search ............ 370/208, 370/204, 328, 329, 335, 342, 441; 375/140, 375/143, 142, 141, 295, 300
See application file for complete search history.

(56) References Cited

U.S. PATENT DOCUMENTS

| | | | |
|---|---|---|---|
| 4,261,051 A * | 4/1981 | Ohnishi et al. ............ 370/58 |
| 4,794,343 A | 12/1988 | Yang | |
| 5,712,869 A * | 1/1998 | Lee et al. .................. 375/206 |
| 5,974,041 A * | 10/1999 | Kornfeld et al. .......... 370/342 |
| 6,018,552 A * | 1/2000 | Uesugi ...................... 375/330 |
| 6,054,894 A * | 4/2000 | Wright et al. .............. 330/149 |
| 6,122,295 A * | 9/2000 | Kato et al. ................. 370/479 |
| 6,307,868 B1 * | 10/2001 | Rakib et al. ............... 370/485 |

FOREIGN PATENT DOCUMENTS

| | | |
|---|---|---|
| EP | 0748 075 | 12/1996 |
| JP | 6-327035 | 11/1994 |
| JP | 7-221735 | 8/1995 |
| JP | 8-79132 | 3/1996 |
| JP | 9-18451 | 1/1997 |
| JP | 9-23207 | 1/1997 |
| JP | 10-126309 | 5/1998 |
| JP | 10-229377 | 8/1998 |
| JP | 10-336151 | 12/1998 |
| JP | 11-154927 | 6/1999 |
| JP | 11-234229 | 8/1999 |
| JP | 11-266168 | 9/1999 |
| KR | 96-6345 | 2/1996 |

OTHER PUBLICATIONS

Rappaport, "Wlreless Communications" 1996, Prentice Hall, pp. 303-306 and 310-312.*
Japanese Office Action dated Jan. 17, 2002 (w/English translation of relevant portion).

(Continued)

*Primary Examiner*—Edan Orgad
(74) *Attorney, Agent, or Firm*—Dickstein, Shapiro, Morin & Oshinsky, LLP.

(57) ABSTRACT

A baseband signal multiplexing circuit controls an amplitude level of a baseband signal to be transmitted on the basis of the number of transmission codes. A gain set value is calculated with which an amplitude value of the baseband signal outputted from a level adjustment circuit is adjusted to an amplitude value matching a dynamic range of a D/A converter based on transmission code number information transmitted from a signal processor. The level adjusting circuit is notified of the gain set value with a control signal.

16 Claims, 11 Drawing Sheets

OTHER PUBLICATIONS

Japanese Office Action issued Mar. 29, 2000 in a related application with English translation of relevant portions.
Motorola and Qualcomm: "Proposed CDMA PCS Standard", Standards Project: Joint Technical Committee, Jan. 1994, pp. 3-22 to 3-23.

European Search Reported dated Jun. 3, 2003.
Japanese Office Action issued Mar. 29, 2000 in related application with English translation of relevant portions.

* cited by examiner

Fig. 4a $$0\;.\;1\;1\;1\;1\;1\;1\;1\;1$$

$$\frac{1}{2}\;\frac{1}{4}\;\frac{1}{8}\;\frac{1}{16}\;\frac{1}{32}\;\frac{1}{64}\;\frac{1}{128}\;\frac{1}{256}$$

Fig. 4b $$\frac{1}{\sqrt{2}} = 0.7071\cdots \doteq \frac{1}{2}+\frac{1}{8}+\frac{1}{16}+\frac{1}{64}$$

$$\frac{1}{\sqrt{2}} = \binom{\text{decimal}}{\text{number}} = 0\;.\;1\;0\;1\;1\;0\;1\;0\;0\;\binom{\text{binary}}{\text{number}}$$

$$\frac{1}{2}\quad\;\;\frac{1}{8}\;\frac{1}{16}\quad\;\frac{1}{64}$$

Fig. 4c $$\frac{1}{\sqrt{3}} = 0.5773\cdots \doteq \frac{1}{2}+\frac{1}{16}+\frac{1}{64}$$

$$\frac{1}{\sqrt{3}} = \binom{\text{decimal}}{\text{number}} = 0\;.\;1\;0\;0\;1\;0\;1\;0\;0\;\binom{\text{binary}}{\text{number}}$$

$$\frac{1}{2}\quad\quad\quad\;\;\frac{1}{16}\quad\;\frac{1}{64}$$

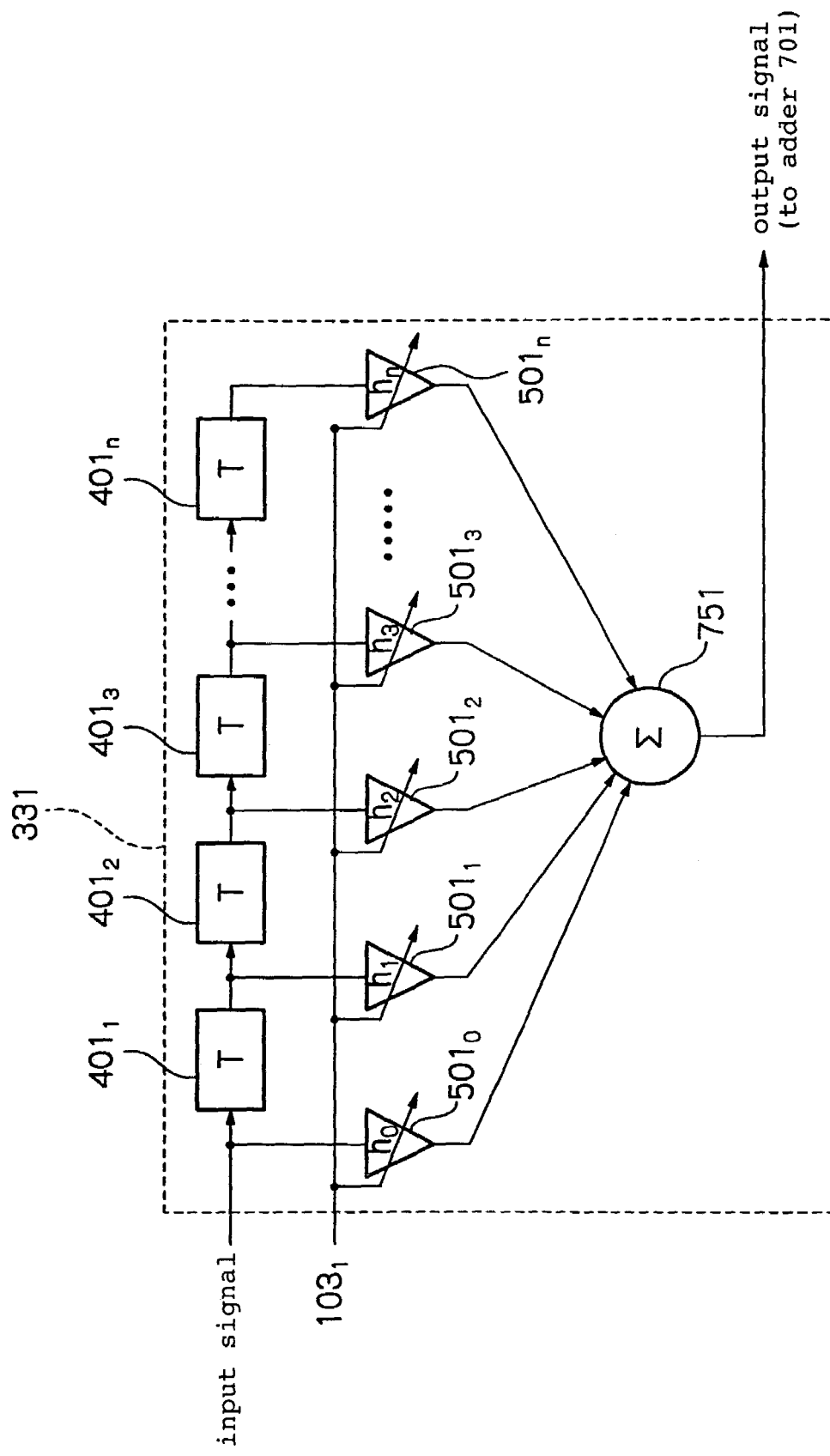

CONTROL OF AMPLITUDE LEVEL OF BASEBAND SIGNAL TO BE TRANSMITTED ON THE BASIS OF THE NUMBER OF TRANSMISSION CODES

BACKGROUND OF THE INVENTION

1. Field of the Invention

The present invention relates generally to a baseband signal multiplexing circuit provided in a transmitter using a spread spectrum communication system for multiplexing a plurality of baseband signals spread with different spread codes, and more particularly to a method of controlling a transmission level of a code-multiplexed baseband signal.

2. Description of the Related Art

In recent years, attention is focused on a spread spectrum communication system resistant to interference and jamming as a communication system for use in a mobile communication system. In the spread spectrum communication system, a transmission side first spreads a digital signal such as voice and image data using a spread code such as a pseudorandom noise code to convert it into a baseband signal with a broader bandwidth than that of the original digital signal. The baseband signal is modulated with modulating systems such as PSK (Phase Shift Keying), FSK (Frequency Shift Keying) or the like to form a high frequency signal which is then transmitted.

One of the spread spectrum communication systems is a DS (Direct Sequence) system. Spread codes used in the system are allocated for respective communication channels with cross-correlation thereof being set to be sufficiently little. Signals spread with different spread codes appear as broadband noises when despread is performed, and only the target signal can be acquired by selecting a spread code used in despread on a reception side. For this reason, the same frequency band can be used by a plurality of communication channels to perform CDMA (Code Division Multiple Access).

According to the spread spectrum communication system, it is possible not only to perform multiple access with a plurality of transmitters, but also to multiplex a plurality of baseband signals spread with different spread codes on one transmitter for transmission. Such a system for multiplexing a plurality of baseband signals using a plurality of spread codes for transmission is called a multicode system.

FIG. 1 shows a configuration of a conventional transmitter using the spread spectrum communication system of such a multicode system when it is simply formed as an extension of prior arts.

The conventional transmitter using the spread spectrum communication system comprises signal processor 1, baseband signal multiplexing circuit 82, RF (Radio Frequency) transmitter 10, and antenna 11.

Signal processor 1 converts digitized transmission data such as voice and image into transmission frame signals in accordance with the spread spectrum communication system and spreads the transmission data with different spread codes to produce a plurality of baseband signals.

Baseband signal multiplexing circuit 82 comprises baseband filters 301 to 303, adder 701, and D/A converter 9.

Baseband filters 301 to 303 are formed from digital FIR (Finite Impulse Response) filters or the like and limit bands of the respective baseband signals outputted from signal processor 1. Adder 701 adds the baseband signals outputted from respective baseband filters 301 to 303 to produce one baseband signal with code-multiplexing.

D/A converter 9 converts the baseband signal which is a digital signal produced by adder 701 into an analog signal. RF transmitter 10 converts the analog signal converted by D/A converter 9 into a signal at a radio frequency for transmission through antenna 11 as a radio wave.

However, in the aforementioned case where multiple codes are transmitted by multiplexing a plurality of baseband signals spread with different spread codes on one transmitter for transmission, the need arises for adjusting the transmission level of respective codes.

For example, assuming that a signal power for one code transmission is P over the full dynamic range of D/A converter 9 for effective utilization thereof, a signal level for multiple-code transmission of N multiplexed codes is provided at a signal power obtained by N×P when the circuit provides an output with simple addition. As a result, a signal including signal power information exceeds the bit width of D/A converter 9 to cause an overflow. This means that D/A converter 9 should be set to have a wider dynamic range. When N transmission codes are multiplexed with effective utilization of the dynamic range of D/A converter 9 in one code transmission, it is required that the amplitude of an signal applied to D/A converter 9 is adjusted to 1 over the square root of N. The amplitude may be adjusted to 1 over the square root of N to obtain the power of 1/N since the power is proportional to the square of the amplitude.

However, the number of transmission codes is not always constant but changed depending on a type of data to be transmitted (voice, image or the like) or the amount of data. For this reason, adjustment of the amplitude of a signal applied to D/A converter 9 to 1 over the square root of N at all times regardless of the number of multiplexed codes causes a problem that the dynamic range is not fully used and a relative quantization error is increased to deteriorate transmission quality. In this manner, a conventional transmitter using the spread spectrum communication system can not effectively use a dynamic range of a D/A converter when the number of transmission codes is changed.

SUMMARY OF THE INVENTION

It is an object of the present invention to provide a baseband signal multiplexing circuit capable of effectively using a dynamic range of a D/A converter independently of the number of transmission codes even when the number of transmission codes is changed.

To achieve the aforementioned object, a baseband signal multiplexing circuit according to the present invention has a plurality of baseband filters, adding means, level adjusting means, D/A converting means, and gain setting means.

The level adjusting means adjusts an amplitude value of a baseband signal produced by the adding means based on a control signal and then outputs the signal. The gain setting means calculates a gain set value with which the amplitude value of the baseband signal outputted from the level adjusting means is adjusted to an amplitude value matching the dynamic range of the D/A converting means based on the number of transmission codes which is the number of multiplexed baseband signals, and notifies the level adjusting means of the gain set value with the control signal.

Since the present invention uses the gain setting means to control the amplitude level of the baseband signal to be transmitted based on the number of transmission codes, the baseband signal applied to the D/A converting means is always adjusted to match the dynamic range of the D/A converting means regardless of the number of transmission codes, thereby making it possible to effectively utilize the dynamic range of the D/A converting means.

Another baseband signal multiplexing circuit according to the present invention comprises a plurality of baseband filters, adding means, a plurality of level adjusting means, D/A converting means, and gain setting means.

The plurality of level adjusting means respectively adjust amplitude values of a plurality of baseband signals with bands limited by the respective baseband filters based on a control signal and then output the signals.

In another baseband signal multiplexing circuit according to the present invention, gain setting means calculates, for respective level adjusting circuits, gain set values with which an amplitude value of a baseband signal outputted from adding means is adjusted to match a dynamic range of D/A converting means based on the number of transmission codes which is the number of multiplexed baseband signals and based on interchannel ratio information for specifying an amplitude ratio of respective baseband signals when a plurality of baseband signals are multiplexed, notifies the level adjusting means of the respective gain set values with a plurality of control signals.

The present invention can perform relative level adjustment for each code since level adjusting means are provided for respective baseband signals spread with respective transmission codes.

A yet further baseband signal multiplexing circuit according to the present invention comprises adding means, a baseband filter, level adjusting means, D/A converting means, and gain setting means.

The adding means adds and code-multiplexes respective baseband signals input thereto to produce one baseband signal. The baseband filter limits the band of the baseband signal produced by the adding means.

Since the present invention provides the baseband filter after the code-multiplexing with the adding means, only one baseband filter is required.

A still further baseband signal multiplexing circuit according to the present invention comprises a plurality of baseband filters, a plurality of first level adjusting means, adding means, a second level adjusting means, and D/A converting means.

The plurality of first level adjusting means respectively adjust amplitude values of respective baseband signals input thereto based on a plurality of first control signals and then output the signals. The adding means adds and code-multiplexes the plurality of baseband signals outputted from the respective first level adjusting means to produce on baseband signal. The second level adjusting means adjusts the amplitude of the baseband signal produced by the adding means based on a second control signal and then outputs the signal.

Gain setting means outputs the first control signals for adjusting an amplitude ratio of the respective baseband signals in accordance with interchannel ratio information for specifying an amplitude ratio of respective baseband signals when a plurality of baseband signals are multiplexed. The gain setting means also calculates a gain set value with which the amplitude value of the baseband signal outputted from the second level adjusting means is adjusted an amplitude value matching the dynamic range of the D/A converting means based on the number of transmission codes which is the number of multiplexed baseband signals, and notifies the second level adjusting means of the gain set value with the second control signal.

A further baseband signal multiplexing circuit according to the present invention comprises a plurality of first level adjusting means, adding means, a baseband filter, second level adjusting means, and D/A converting means.

The first level adjusting means respectively adjust amplitude values of baseband signals input thereto based on a plurality of first control signals. The adding means adds and code-multiplexes the plurality of baseband signals outputted from the respective first level adjusting means to produce one baseband signal and then outputs the signal. The baseband filter limits the band of the baseband signal produced by the adding means. The second level adjusting means adjusts the amplitude value of the baseband signal with the band limited by the baseband filter based on the second control signal and then outputs the signal.

The present invention uses the first level adjusting means to adjust an amplitude ratio of the respective baseband signals and uses the second level adjusting means to provide overall amplitude level adjustment, thereby making it possible to facilitate fine adjustment of an amplitude level.

The level adjustment circuit according to the present invention comprises a plurality of bit shift means, a plurality of switches, and adding means.

The plurality of bit shift means produce signals by shifting baseband signals input thereto to the right by different certain bits. The plurality of switches select outputs from the respective bit shift means in accordance with a desired gain to be set. The adding means adds outputs from the respective switches for output as one signal.

The present invention can provide a reduction in power consumption since a level adjusting circuit is formed without using a multiplier.

A yet further baseband signal multiplexing circuit according to the present invention comprises a plurality of baseband filters, adding means, gain setting means, and D/A converting means.

The plurality of baseband filters limit bands of respective baseband signals input thereto and adjust amplitude values of the baseband signals based on control signals, and then outputs the signal.

According to an embodiment of the present invention, each of the baseband filters comprises a plurality of delay elements, a plurality of coefficient multipliers, and an adder.

The plurality of delay elements delay input signals by a certain time period to output the signals as tap outputs. Each of the plurality of coefficient multipliers multiplies each of the tap outputs delayed by the delay elements by a filter coefficient of preset filter coefficients that is specified by a control signal. The adder adds a plurality of output signals from the respective coefficient multipliers and then outputs the resulting signal.

The present invention has no need to independently provide level adjusting means since an amplitude level is adjusted by changing filter coefficients to be multiplied by the respective tap outputs in the baseband filter.

The above and other objects, features and advantages of the present invention will become apparent from the following description with reference to the accompanying drawings which illustrate examples of the present invention.

BRIEF DESCRIPTION OF THE DRAWINGS

FIG. 4a is a diagram showing values in binary number representation corresponding to decimal places;

FIG. 4b is a diagram showing $½^{1/2}$ represented in a binary number;

FIG. 4c is a diagram showing $⅓^{1/2}$ represented in a binary number;

FIG. 11 is a block diagram showing a configuration of baseband filters 331, 332 and 333 in FIG. 10.

DETAILED DESCRIPTION OF THE PREFERRED EMBODIMENTS

First Embodiment

Figure 2:
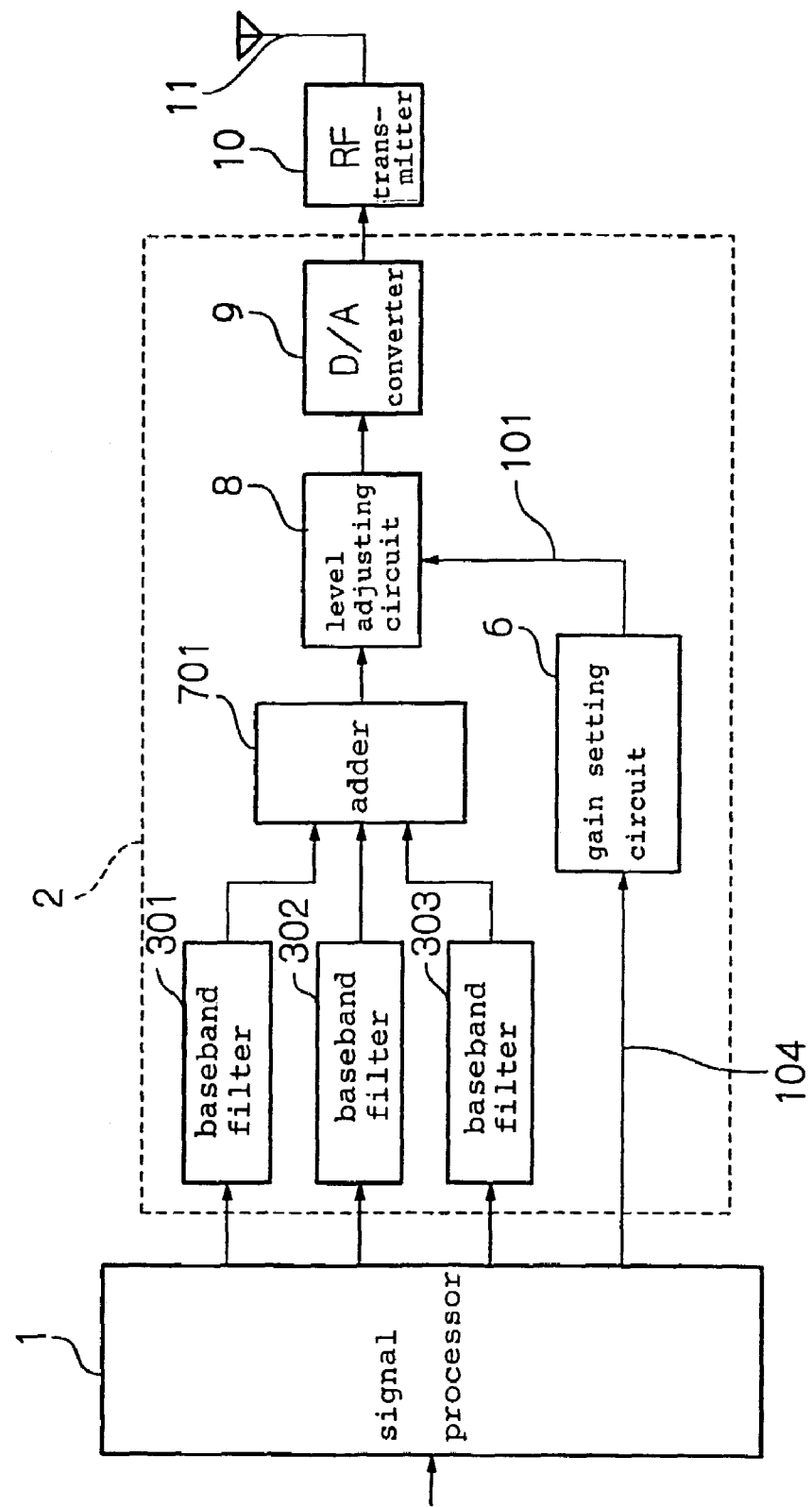
FIG. 2 is a block diagram showing a configuration of a transmitter using the spread spectrum communication system according to a first embodiment of the present invention.

Referring now to FIG. 2, there is shown a transmitter using the spread spectrum communication system according to a first embodiment of the present invention for illustrating an example of a configuration capable of multiplexing up to three transmission codes. The number of transmission codes refers to the number of actually multiplexed baseband signals and is three at maximum in the baseband signal multiplexing circuit of the embodiment.

The transmitter using the spread spectrum communication system in the embodiment comprises signal processor circuit 1, baseband signal multiplexing circuit 2, RF transmitter 10, and antenna 11.

Figure 1:
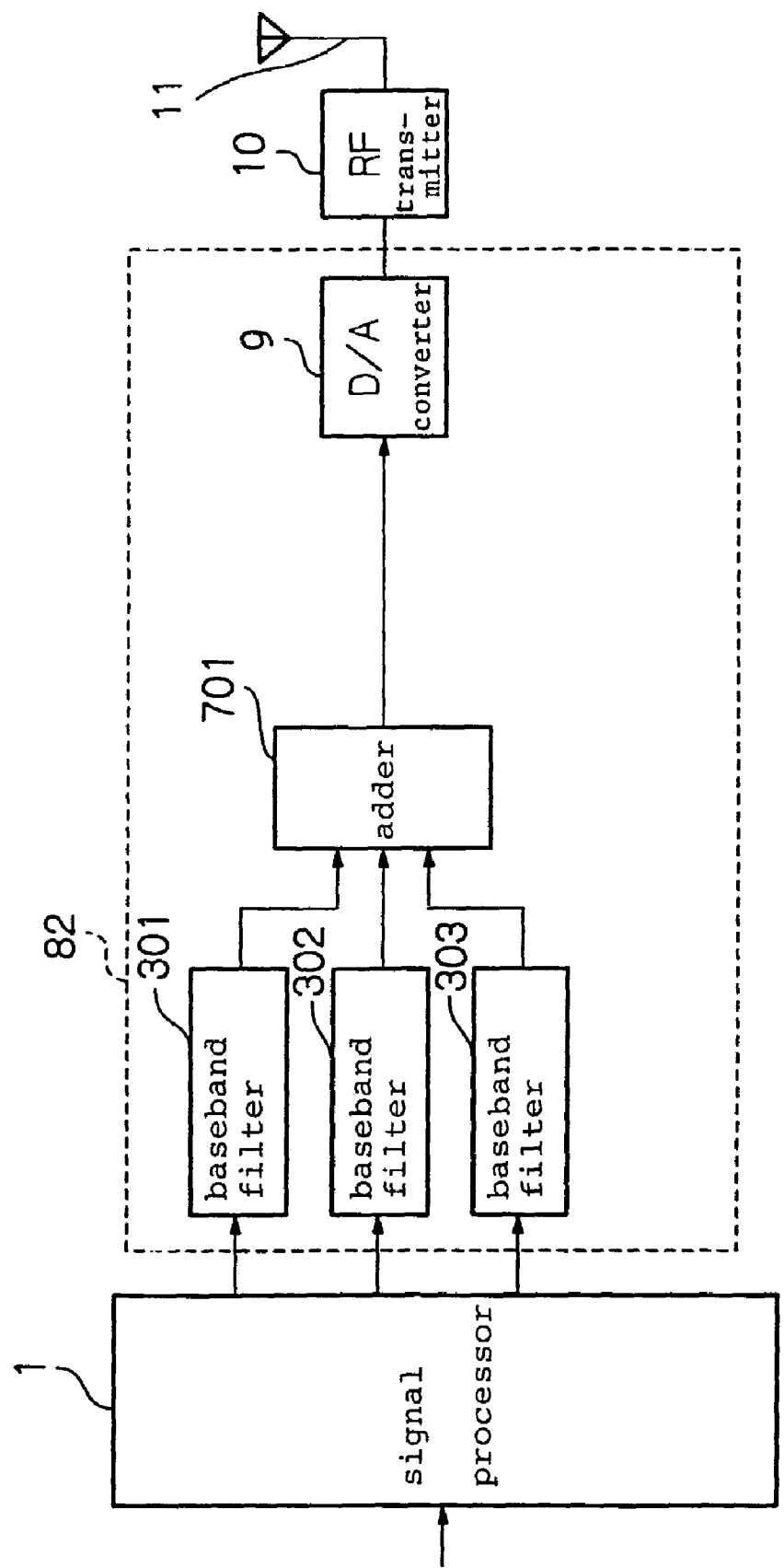
FIG. 1 is a block diagram showing a configuration of a conventional transmitter using a spread spectrum communication system.

Baseband signal multiplexing circuit 2 differs from baseband signal multiplexing circuit 82 in the conventional transmitter using the spread spectrum communication system shown in FIG. 1 in that level adjusting circuit 8 is newly provided between adder 701 and D/A converter 9 and that gain setting circuit 6 is newly provided.

Signal processor 1 in the embodiment outputs transmission code number information 104 to baseband signal multiplexing circuit 2. On the basis of transmission code number information 104 transmitted from signal processor 1, gain setting circuit 6 calculates a gain set value with which an amplitude value of a baseband signal outputted from level adjusting circuit 8 is adjusted to an amplitude value matching the dynamic range of D/A converter 9, and notifies level adjusting circuit 8 of the gain set value through control signal 101.

Level adjusting circuit 8 adjusts an amplitude value of a signal multiplexed by adder 701 based on control signal 101 outputted from gain setting circuit 6 and then outputs the signal to D/A converter 9. While level adjusting circuit 8 is generally formed using a multiplier, a conventional level adjusting circuit formed using a multiplier has had a problem of high power consumption. For this reason, in the embodiment, level adjusting circuit 8 is formed without using a multiplier to reduce a scale of a circuit and to reduce power consumption.

Figure 3:
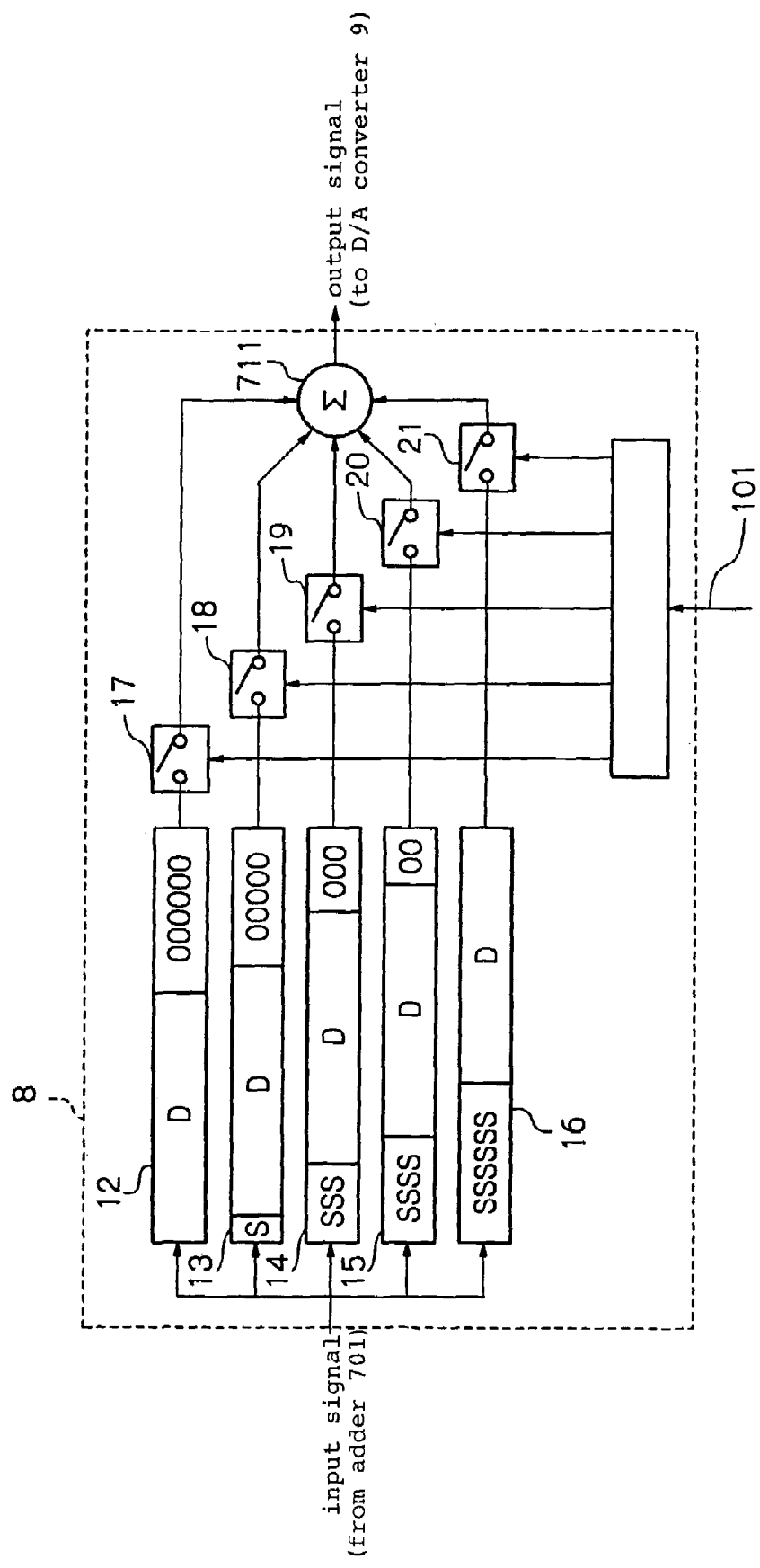
FIG. 3 is a block diagram showing a configuration of level adjusting circuit 8 in FIG. 2.

FIG. 3 is a block diagram showing a configuration of level adjusting circuit 8 in FIG. 2.

Level adjusting circuit 8 comprises bit shift sections 12 to 16, switches 17 to 21, and an adder 711.

Bit shift sections 12 to 16 shift the input baseband signals to the right by 0, 1, 3, 4, and 6 bits before output. Specifically, each of bit shift sections 12 to 16 produces a signal shifted by some bits depending on which bit in the input signal is used as the top. Bit shift sections 12 to 16 may be realized without forming each of them with a shift register or the like.

Switches 17 to 21 are controlled with control signal 101 and select the outputs from bit shift sections 12 to 16 for output to adder 711. Adder 711 adds the output from switches 17 to 21 to provide one signal which is outputted to D/A converter 9.

In the case of a small device with a relatively small number of transmission codes such as a mobile phone, a scale of a circuit can be small if a level adjusting circuit is realized with a configuration for shifting baseband signals to be transmitted by fixed bits and then combining and adding the signals as in the embodiment.

Next, the operation of level adjusting circuit 8 shown in FIG. 3 will be described. The input baseband signal in FIG. 3 is divided into individual signals shifted to the right by 1, 3, 4 and 6 bits, respectively. "S" in FIG. 3 represents a sign bit.

An amplitude value of a digitized baseband signal is represented in a binary number. In the binary number, an increase in digit by one represents a double magnitude, while a reduction in digit by one represents a half magnitude. Thus, when a number smaller than one is represented in a binary number, respective decimal places take values shown in FIG. 4. In an amplitude level represented in a binary number, a shift of n bits to the right results in a value of $½^n$.

For example, 1 over the square root of 2 ($½^{1/2}$) is "0.10110100" in binary number representation as shown in FIG. 4b. Similarly, 1 over the square root of 3 ($⅓^{1/2}$) is "0.10010100" in binary number representation as shown in FIG. 4c.

Therefore, level adjusting circuit 8 may add signals shifted by 1, 3, 4 and 6 bits at adder 711 in order to adjust the amplitude of the input baseband signal to 1 over the square root of 2 ($½^{1/2}$) in the case of two multiplexed codes. Level adjusting circuit 8 may add signals shifted by 1, 4 and 6 bits at adder 711 in order to adjust the amplitude of the input baseband signal to 1 over the square root of 3 ($⅓^{1/2}$) in the case of three multiplexed codes.

Table 1 shows amounts of gain which can be set with a structure such as level adjusting circuit 8.

(Table 1)

Table 1 uses a case where seven bit shift sections are provided. An ideal dB value is a desired gain to be set and a true value is a value representing the ideal dB value with a ratio. An approximate dB value is a gain actually set with the level adjusting circuit.

For example, when a desired gain to be set is 5 dB (1.77827941), an approximate dB value 5.014497547 dB can be realized.

As the number of bit shift sections is increased, an error between an ideal dB value and an approximate dB value is reduced. However, even with seven bit shift sections, the error is so small as shown in Table 1 that it causes no practical problems.

Next, the operation in the embodiment will be described in detail with reference to the drawings.

First, description will be made for the overall operation of the transmitter using the spread spectrum communication system of the embodiment.

Binary baseband signals spread with respective spread codes at signal processor 1 are applied to baseband filters 301, 302 and 303 which limit the bands thereof. The filtered baseband signals including multilevel amplitude information are multiplexed at adder 701 and then applied to level adjusting circuit 8. Signal processor 1 notifies current transmission code number information 104 to gain setting circuit 6 which generates control signal 101 for controlling level adjusting circuit 8 such that the baseband signal outputted from level adjusting circuit 8 has an appropriate signal amplitude. D/A converter 9 converts the baseband signals with adjusted amplitude from digital to analog form. The analog signal is applied to RF transmitter 10 and transmitted from antenna 11 as a radio wave after conversion into a radio frequency. Since RF transmitter 10 does not relates directly to the present invention, the detailed configuration thereof is omitted.

Next, description will be made for detailed operations when one code is transmitted with the transmitter using the spread spectrum communication system in the embodiment.

In a state where one code transmission is performed, one of baseband filters 301, 302 and 303 is normally used. The outputs from the remaining two baseband filters are not added at adder 701, and only the signal passing through a baseband filter corresponding to one code is applied to level adjusting circuit 8.

At this point, since gain setting circuit 6 receives setting information for one code transmission from signal processor 1 through transmission code information 104, it turns on only switch 17 in level adjusting circuit 8 shown in FIG. 3 with control signal 101 and turns off other switches 18 to 21. This causes level adjusting circuit 8 to output the input baseband signal to D/A converter 9 without any processing.

Next, description will be made for detailed operations when three multiplexed codes are transmitted with the transmitter using the spread spectrum communication system in the embodiment.

When three multiplexed codes are transmitted, gain setting circuit 6 turns on only switches 18, 20 and 21 by changing control signal 101. Therefore, the amplitude value of the baseband signal outputted from adder 711 is a value obtained by multiplying the input signals by ½, 1/16 and 1/64, respectively, and then adding the multiplied signals, and the obtained value is approximately equal to 1 over the square root of 3 of the amplitude value of the input signal.

Similarly, when two multiplexed codes are transmitted, gain setting circuit 6 turns on all of switches 18, 19, 20 and 21 by changing control signal 101. Therefore, the amplitude value of the baseband signal outputted from adder 711 is a value obtained by multiplying the input signals by ½, ⅛, 1/16 and 1/64, respectively, and then adding the multiplied signals, and the obtained value is approximately equal to 1 over the square root of 2 of the amplitude value of the input signal.

In the transmitter using the spread spectrum communication system in the embodiment, level adjusting circuit 8 is provided in baseband signal multiplexing circuit 2 for adjusting the signal level based on the number of transmission codes, thereby allowing a fixed signal power of an input to D/A converter 9 when the number of transmission codes is changed. Therefore, it is possible to effectively use the dynamic range of D/A converter 9 regardless of the number of transmission codes.

Second Embodiment

Figure 5:
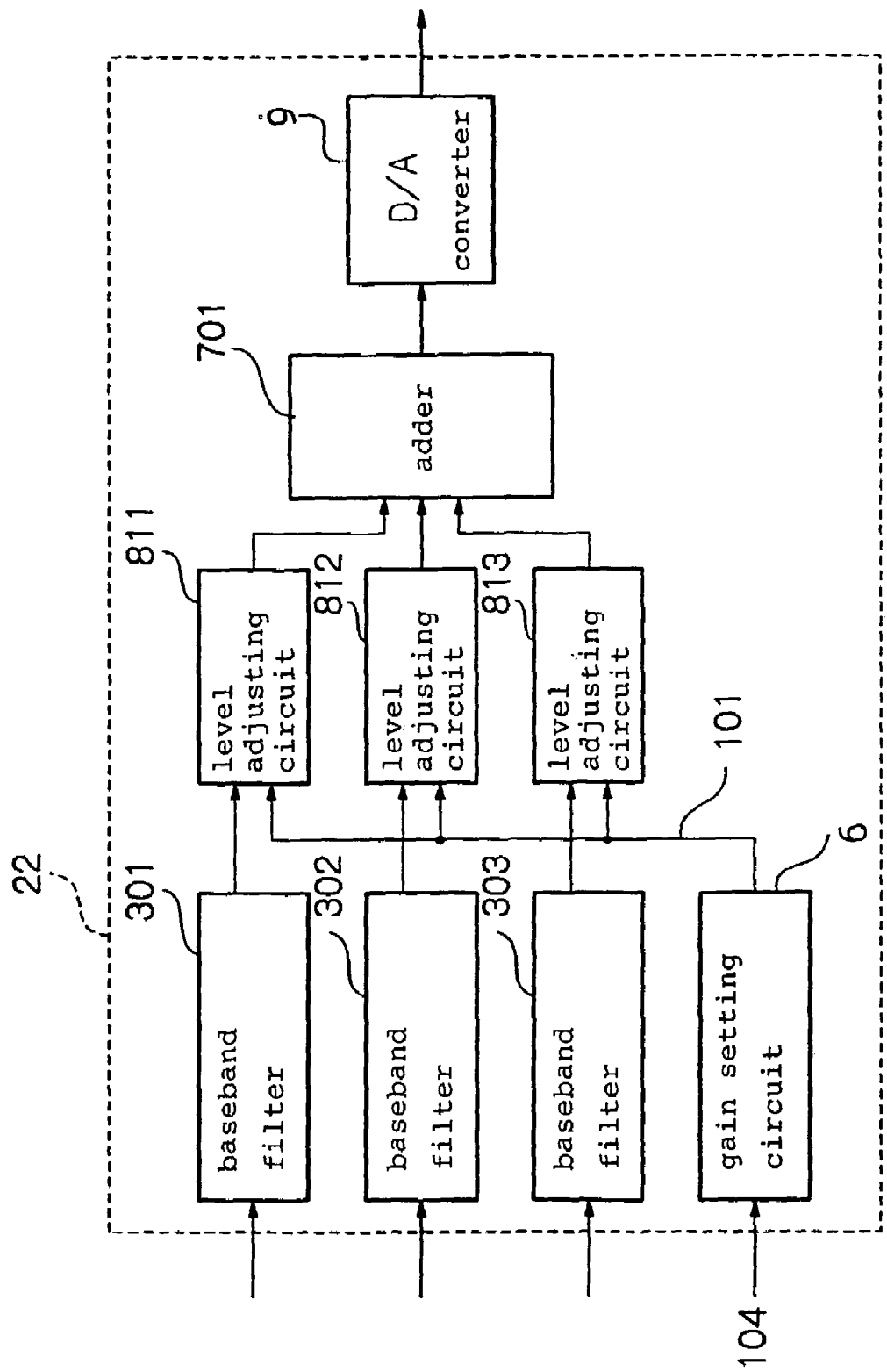
FIG. 5 is a block diagram showing a configuration of baseband signal multiplexing circuit 22 in a transmitter using the spread spectrum communication system according to a second embodiment of the present invention.

Next, description will be made for a transmitter using the spread spectrum communication system according to a second embodiment of the present invention with reference to FIG. 5. In FIG. 5, reference numerals identical to those in FIG. 2 designate the same components.

The embodiment differs from the first embodiment shown in FIG. 2 in that baseband signal multiplexing circuit 22 replaces baseband signal multiplexing circuit 2.

Baseband signal multiplexing circuit 22 differs from the baseband signal multiplexing circuit 2 in that level adjusting circuit 8 provided between adder 701 and D/A converter 9 in circuit 2 is removed and level adjusting circuits 811 to 813 are newly provided between baseband filters 301 to 303 and adder 701, respectively.

Level adjusting circuits 811 to 813 have similar configurations to that of level adjusting circuit 8 shown in FIG. 2 and respectively adjust the amplitude values of baseband signals with limited bands outputted from baseband filters 301 to 303 based on control signal 101 outputted from gain setting circuit 6 and then output the signals to adder 701.

The embodiment has similar effects to those of the first embodiment as described above since the transmission level is adjusted on the basis of the number of transmission codes.

Third Embodiment

Figure 6:
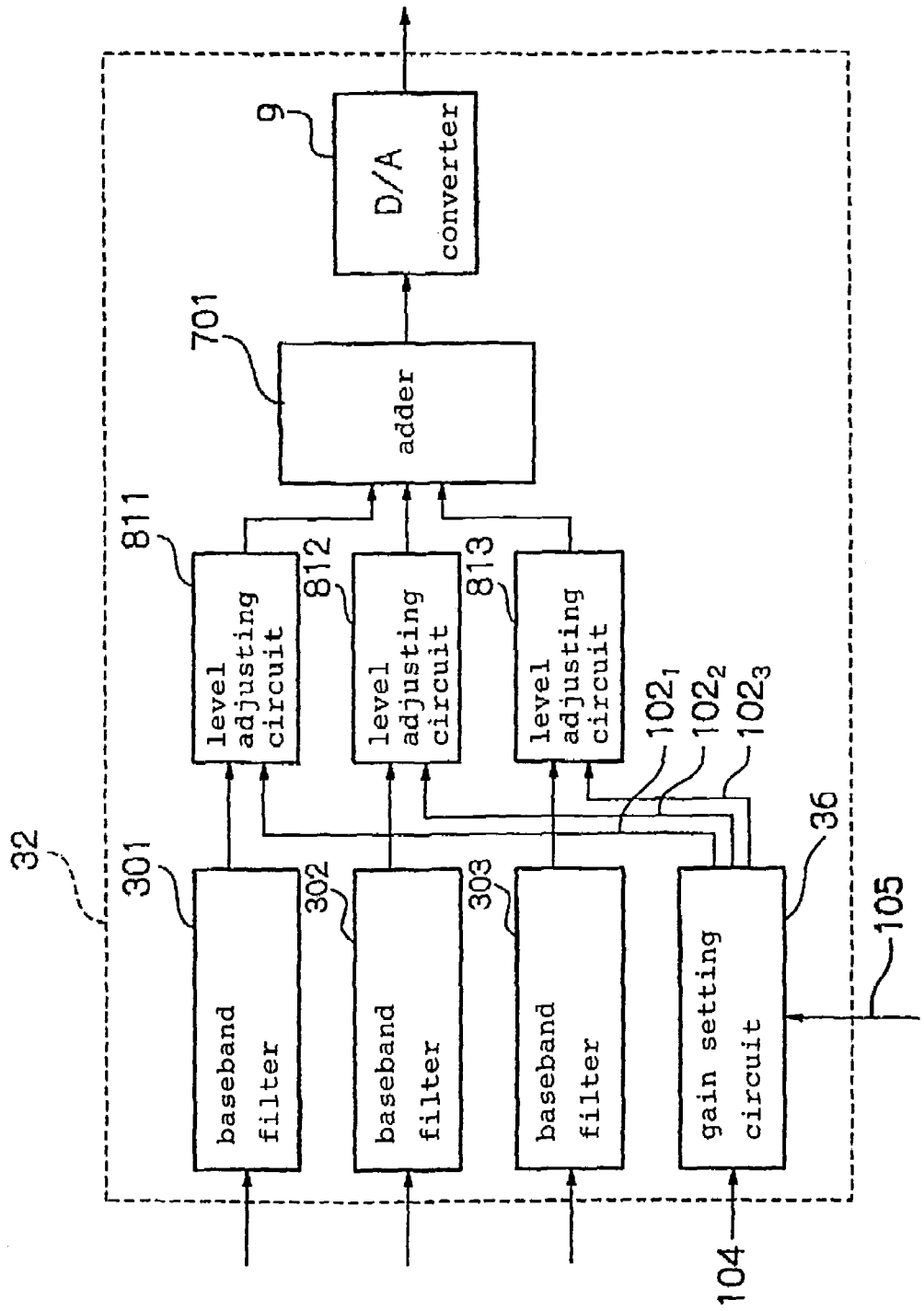
FIG. 6 is a block diagram showing a configuration of baseband signal multiplexing circuit 32 in a transmitter using the spread spectrum communication system according to a third embodiment of the present invention.

Next, description will be made for a transmitter using the spread spectrum communication system according to a third embodiment of the present invention with reference to FIG. 6. In FIG. 6, reference numerals identical to those in FIG. 3 designate the same components.

The embodiment differs from the second embodiment shown in FIG. 5 in that baseband signal multiplexing circuit 32 replaces baseband signal multiplexing circuit 22.

Baseband signal multiplexing circuit 32 has a similar configuration to that of baseband signal multiplexing circuit 22 except that gain setting circuit 36 replaces gain setting circuit 6.

Also, in the embodiment, interchannel ratio information 105 is applied to gain setting circuit 36 for specifying the ratio of amplitudes of respective baseband signals when a plurality of baseband signals are multiplexed.

Gain setting circuit 36 calculates gain set values with which the amplitude value of a baseband signal outputted from adder 701 is adjusted to an amplitude value matching the dynamic range of D/A converter 9 based on transmission code number information 104 and interchannel ratio information 105 for respective level adjusting circuits 811 to 813, and notifies level adjusting circuits 811 to 813 of the respective gain set values with control signals $102_1$ to $102_3$.

Level adjusting circuits 811 to 813 in the embodiment independently adjust amplitude values of baseband signals with limited bands outputted from baseband filters 301 to 303 based on control signals $102_1$ to $102_3$ outputted from gain setting circuit 36, and then output the signals to adder 701.

The embodiment has similar effects to those of the first and second embodiments as described above since the transmission level is adjusted on the basis of the number of transmission codes. In the embodiment, however, since level adjusting circuits 811 to 813 are provided for respective baseband signals spread with respective spread codes and control signals $102_1$ to $102_3$ are individually provided for controlling the gain set values therefor, the embodiment provides not only level adjustment after signals are added to produce one baseband signal as in the second embodiment, but also the effect of allowing relative level adjustment for respective codes.

Fourth Embodiment

Figure 7:
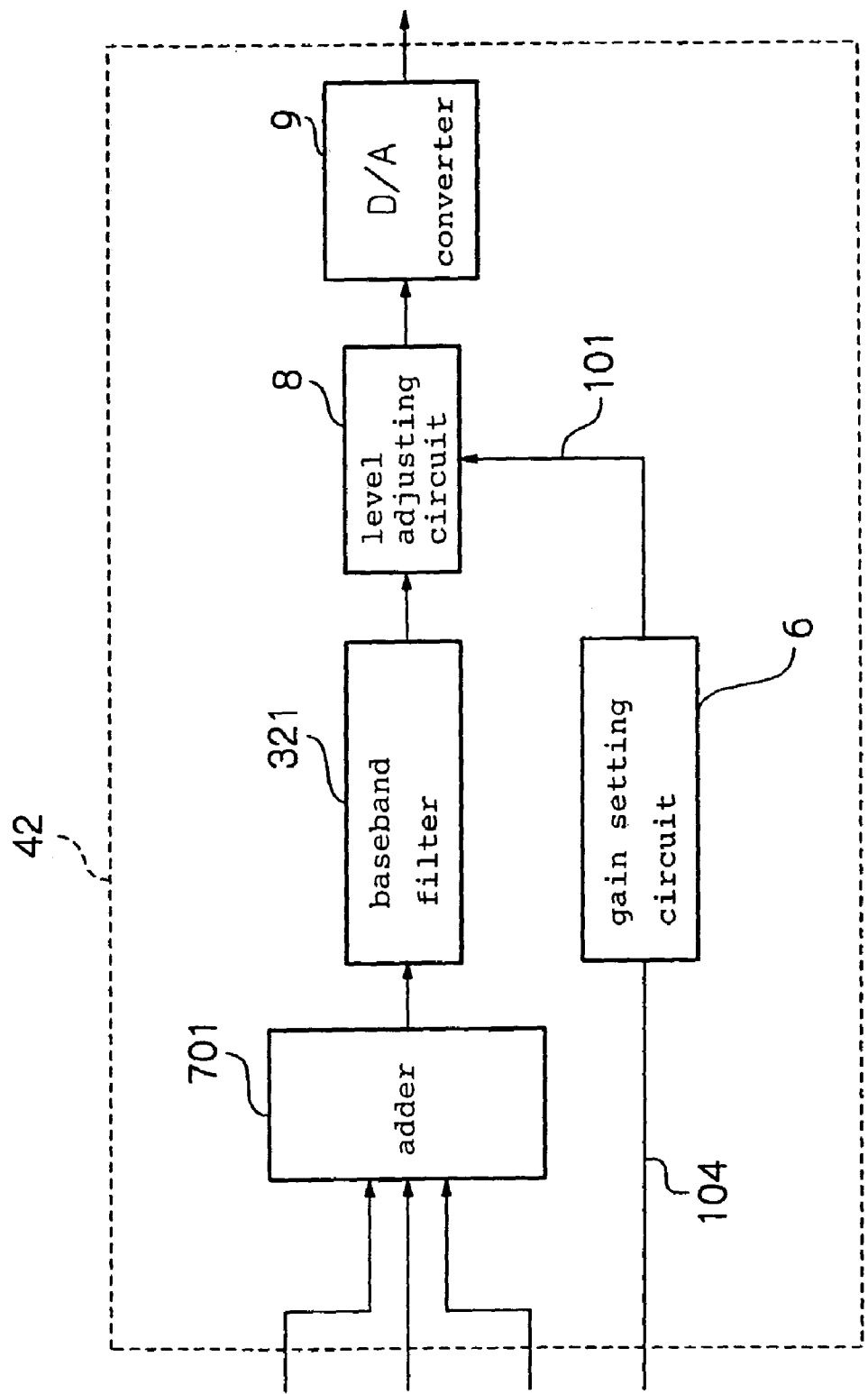
FIG. 7 is a block diagram showing a configuration of baseband signal multiplexing circuit 42 in a transmitter using the spread spectrum communication system according to a fourth embodiment of the present invention.

Next, description will be made for a transmitter using the spread spectrum communication system according to a fourth embodiment of the present invention with reference to FIG. 7. In FIG. 7, reference numerals identical to those in FIG. 2 designate the same components.

The embodiment differs from the first embodiment shown in FIG. 2 in that baseband signal multiplexing circuit 42 replaces baseband signal multiplexing circuit 2.

Baseband signal multiplexing circuit 42 differs from baseband signal multiplexing circuit 2 in that the position at which adder 701 is replaced with the position at which baseband filters 301 to 303 are provided, and that one baseband filter 321 replaces three baseband filters 301 to 303.

Adder 701 in the embodiment adds a plurality of baseband signals outputted from signal processor 1 to produce one baseband signal.

Baseband filter 321 has a similar configuration to those of baseband filters 301 to 303 and limits the band of the baseband signal outputted from adder 701.

In the embodiment, adder 701 multiplexes three codes before baseband filter 321 limits the band, thereby requiring only one baseband filter as compared with three required in the first embodiment.

Fifth Embodiment

Figure 8:
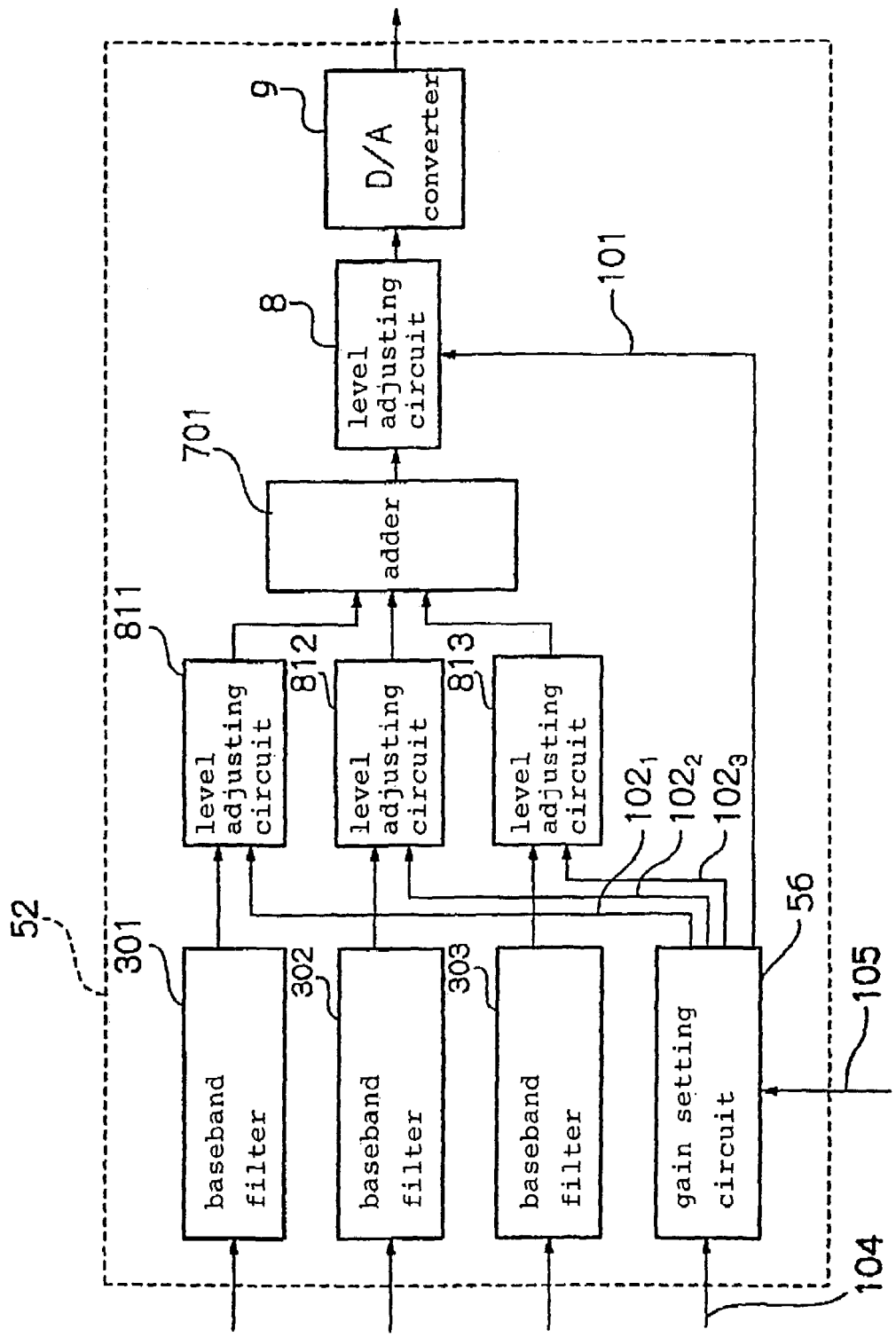
FIG. 8 is a block diagram showing a configuration of baseband signal multiplexing circuit 52 in a transmitter using the spread spectrum communication system according to a fifth embodiment of the present invention.

Next, description will be made for a transmitter using the spread spectrum communication system according to a fifth embodiment of the present invention with reference to FIG. 8. In FIG. 8, reference numerals identical to those in FIGS. 2 and 6 designate the same components.

The embodiment differs from the third embodiment shown in FIG. 6 in that baseband signal multiplexing circuit 52 replaces baseband signal multiplexing circuit 32.

Baseband signal multiplexing circuit 52 differs from baseband signal multiplexing circuit 32 in that level adjusting circuit 8 is provided between adder 701 and D/A converter 9 and that gain setting circuit 56 replaces gain setting-circuit 36.

Gain setting circuit 56 outputs control signals $102_1$ to $102_3$ to level adjusting circuits 811 to 813 for adjusting the amplitude ratio of respective baseband signals in accordance with interchannel ratio information 105 transmitted from signal processor 1. Gain setting circuit 56 also calculates a gain set value with which an amplitude value of a baseband signal outputted from level adjusting circuit 8 is adjusted to an amplitude value matching the dynamic range of D/A converter 9 based on transmission code number information 104 and notifies level adjusting circuit 8 of the gain set value with control signal 101.

In the embodiment, since level adjusting circuits 811 to 813 can adjust the ratio of levels among respective baseband signals and level adjusting circuit 8 can provide the overall level adjustment, it is possible to easily provide fine level adjustment. For example, level adjusting circuits 811 to 813 makes gain set value of 1:2:1 for respective baseband signals and level adjusting circuit 8 makes gain set value of $\frac{1}{4}^{1/2}$, thereby making it possible to obtain the ratio 1:2:1 of respective baseband signals and to match the level of a combined baseband signal with the dynamic range of D/A converter 9.

Sixth Embodiment

Figure 9:
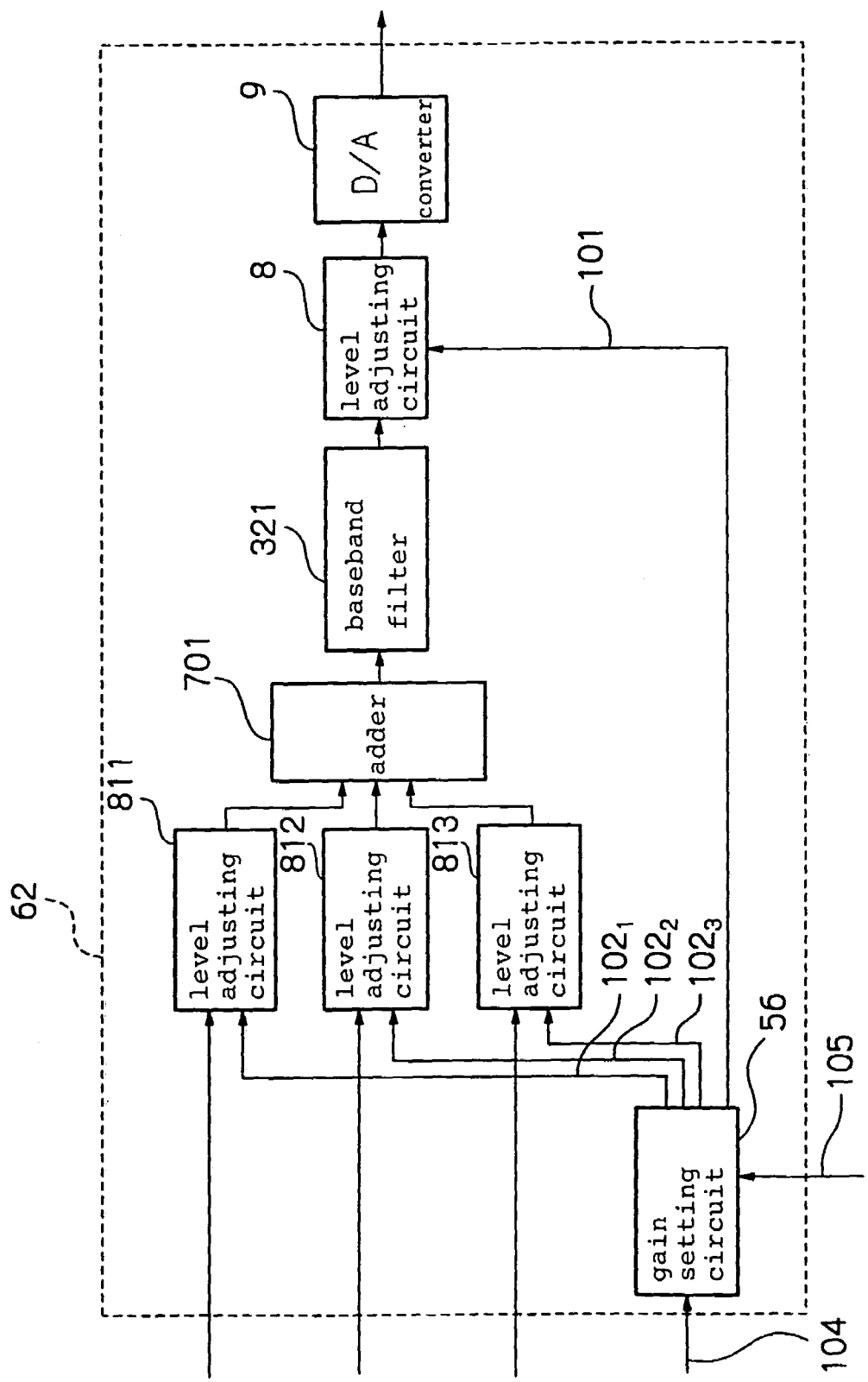
FIG. 9 is a block diagram showing a configuration of baseband signal multiplexing circuit 62 in a transmitter using the spread spectrum communication system according to a sixth embodiment of the present invention.

Next, description will be made for a transmitter using the spread spectrum communication system according to a sixth embodiment of the present invention with reference to FIG. 9. In FIG. 9, reference numerals identical to those in FIGS. 7 and 8 designate the same components.

The embodiment differs from the fifth embodiment shown in FIG. 7 in that baseband signal multiplexing circuit 62 replaces baseband signal multiplexing circuit 52.

Baseband signal multiplexing circuit 62 differs from baseband signal multiplexing circuit 52 in that three baseband filters 301 to 303 are removed and that baseband filter 321 is newly provided between adder 701 and level adjusting circuit 8.

The embodiment requires only one baseband filter as compared with three required in the fifth embodiment.

Seventh Embodiment

Figure 10:
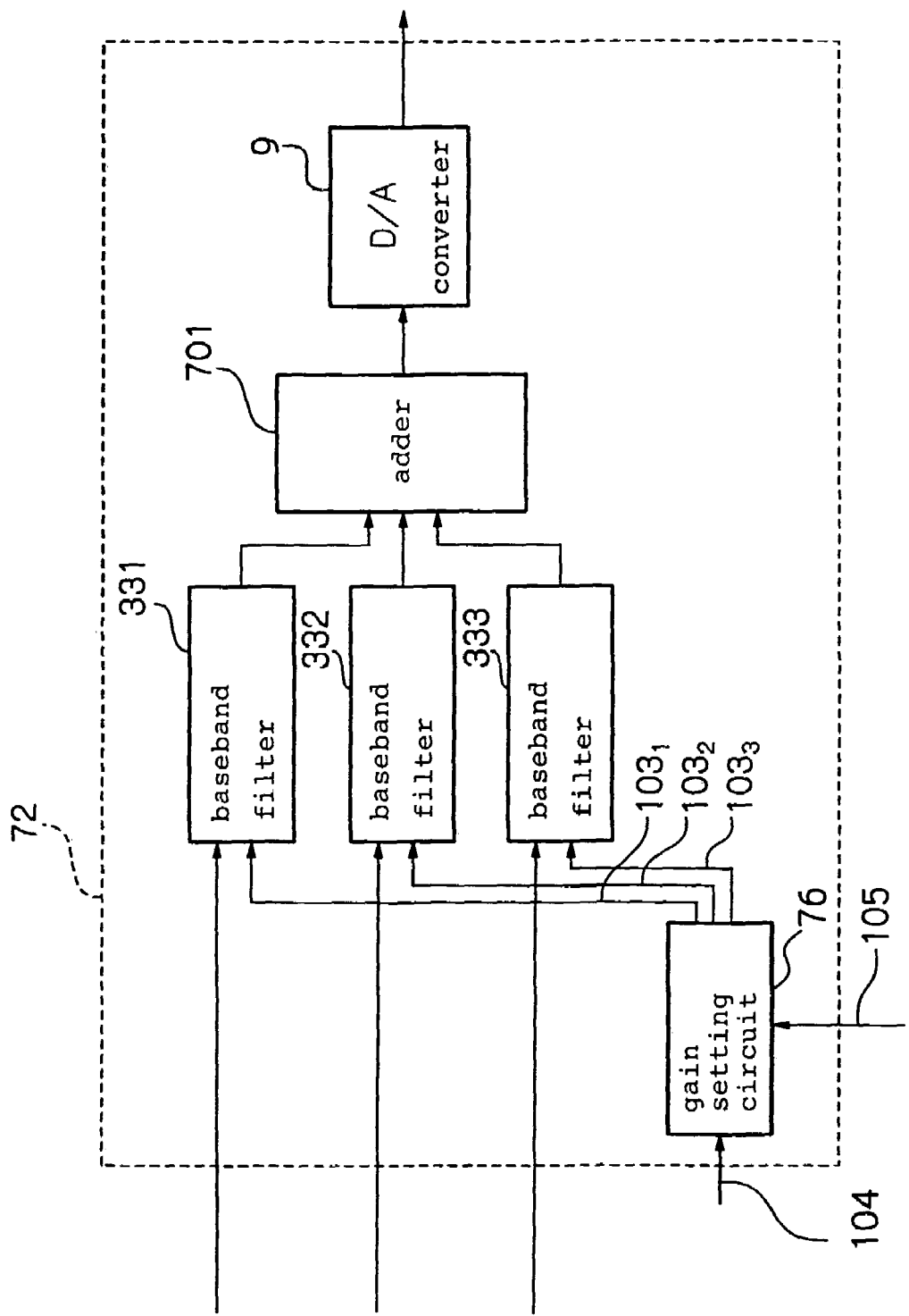
FIG. 10 is a block diagram showing a configuration of baseband signal multiplexing circuit 72 in a transmitter using the spread spectrum communication system according to a seventh embodiment of the present invention.

Next, description will be made for a transmitter using the spread spectrum communication system according to a seventh embodiment of the present invention with reference to FIG. 10. In FIG. 10, reference numerals identical to those in FIG. 2 designate the same components.

The embodiment differs from the first embodiment shown in FIG. 2 in that baseband signal multiplexing circuit 72 replaces baseband signal multiplexing circuit 2.

Baseband signal multiplexing circuit 72 comprises baseband filters 331 to 333, adder 701, D/A converter 9, and gain setting circuit 76.

In the first to sixth embodiments, level adjusting circuit 8 or 811 to 813 are inserted before or after adder 701 to perform signal level adjustment. In the present embodiment, however, signal level adjustment is performed by changing filter coefficients of baseband filters 331 to 333.

Gain setting circuit 76 calculates gain set values with which an amplitude value obtained by adding baseband signals outputted from baseband signals 331 to 333 is adjusted to an amplitude value matching the dynamic range of /A converter 9 based on the number of transmission codes transmitted from signal processor 1, and notifies baseband filters 331 to 333 of the gain set values with control signals $103_1$ to $103_3$.

Signal level adjustment is performed by inputting baseband signals to be transmitted for respective codes and control signals $103_1$ to $103_3$ from gain setting circuit 76 to baseband filters 331 to 333. Signals outputted from respective baseband filters 331 to 333 are code-multiplexed at adder 701 and then outputted in analog form from D/A converter 9.

FIG. 11 shows an example in which baseband filter 331 in FIG. 10 is formed from a digital FIR filter for adjusting its coefficient. Since baseband filters 332 and 333 have similar configurations to that of baseband filter 331, the description thereof is omitted.

Baseband filter 331 comprises delay elements $401_1$ to $401_n$, coefficient multipliers $501_0$ to $501_n$, and adder 751.

Delay elements $401_1$ to $401_n$ delay input signals by a unit time and then outputs them as tap outputs.

Each of coefficient multipliers $501_0$ to $501_n$ has a plurality of filter coefficients and multiplies each of the tap outputs delayed by delay elements $401_1$ to $401_n$ by a filter coefficient specified by control signal $103_1$.

For example, $501_0$ has three filter coefficients of $h_0$, $h_0/2^{1/2}$, $h_0/3^{1/2}$, and selects one of the three filter coefficients specified by control signal $103_1$ for multiplication by the tap output.

Adder 751 adds n+1 output signals from coefficient multipliers $501_0$ to $501_n$ and outputs the added signal to adder 701.

The input signals are delayed by delay elements $401_1$ to $401_n$ and outputted as tap outputs. When a gain set value is one, for example, the respective tap outputs are multiplied by filter coefficients $h_0, h_1, \ldots, h_n$ at coefficient multipliers $501_0$ to $501_n$. The multiplication results are added at adder 751 and outputted as an output signal.

Input control signal $103_1$ adjusts the filter coefficients depending on the number of transmission codes to perform control based on the number of transmission codes.

For example, when the number of transmission codes is three, $(h_0/3^{1/2}, h_1/3^{1/2}, \ldots, h_n/3^{1/2})$ are selected, and when the number of transmission codes is two, $(h_0/2^{1/2}, h_1/2^{1/2}, \ldots, h_n/2^{1/2})$ are selected.

Assuming that the amplitude value of the output signal from adder 751 is $y_n$, respective tap outputs are $x_n, X_{n-1}, \ldots, x_0$, then $y_n$ is derived from the following equation:

$$y_n = h_0 X_n + h_1 X_{n-1} + h_2 X_{n-2} + \ldots + h_n X_0$$

The embodiment has no need to provide a level adjusting circuit since baseband filters 331 to 333 provide signal level adjustment as well as band limitation.

In the embodiment, gain setting circuit 76 outputs three control signals $103_1$ to $103_3$ to independently make gain set value of baseband filters 331 to 333. However, gain setting circuit 76 may output one control signal to simultaneously make gain set value for baseband filters 331 to 333. Such a configuration requires only one control signal.

While the aforementioned first to seventh embodiments use the case of three transmission codes for description, the present invention is not limited thereto and similarly applicable to the case of four or more transmission codes. While preferred embodiments of the present invention have been described using specific terms, such description is for illustrative purposes only, and it is to be understood that changes and variations may be made without departing from the spirit or scope of the following claims.

TABLE 1

| ideal value (dB) | true value | MSB 0 | 1 | 2 | 3 | 4 | 5 | 6 | LSB 7 | approximate value (dB) |
|---|---|---|---|---|---|---|---|---|---|---|
| shift amount | | 0 | 1 | 2 | 3 | 4 | 5 | 6 | 7 | |
| | | 1 | 0.5 | 0.25 | 0.125 | 0.0625 | 0.03125 | 0.015625 | 0.0078125 | |
| 5 | 1.77827941 | 1 | 1 | 1 | 0 | 0 | 1 | 0 | 0 | 5.014497547 |
| 4 | 1.584893192 | 1 | 1 | 0 | 0 | 1 | 1 | 0 | 0 | 4.048403956 |
| 3 | 1.412537545 | 1 | 0 | 1 | 1 | 0 | 1 | 0 | 0 | 2.961250709 |
| 2 | 1.258925412 | 1 | 0 | 1 | 0 | 0 | 0 | 1 | 0 | 2.046100898 |
| 1 | 1.122018454 | 1 | 0 | 0 | 1 | 0 | 0 | 0 | 0 | 1.023050449 |
| 0 | 1 | 1 | 0 | 0 | 0 | 0 | 0 | 0 | 0 | 0 |
| −1 | 0.891250938 | 0 | 1 | 1 | 1 | 0 | 0 | 1 | 0 | −1.006102366 |
| −2 | 0.794328235 | 0 | 1 | 1 | 0 | 0 | 1 | 1 | 0 | −1.972195958 |
| −3 | 0.707945784 | 0 | 1 | 0 | 1 | 1 | 0 | 1 | 0 | −3.059349204 |
| −4 | 0.630957344 | 0 | 1 | 0 | 1 | 0 | 0 | 0 | 1 | −3.974499015 |
| −5 | 0.562341325 | 0 | 1 | 0 | 0 | 1 | 0 | 0 | 0 | −4.997549464 |
| −6 | 0.501187234 | 0 | 1 | 0 | 0 | 0 | 0 | 0 | 0 | −6.020599913 |

What is claimed is:

1. A baseband signal multiplexing circuit for multiplexing a plurality of baseband signals spread with different spread codes into one baseband signal, comprising:

a plurality of baseband filters for respectively limiting bands of the respective baseband signals input thereto;

adding means for adding and code-multiplexing the plurality of baseband signals with the bands limited by said respective baseband filters to produce one baseband signal;

level adjusting means for adjusting an amplitude value of the baseband signal produced by said adding means based on a control signal to output the signal;

D/A converting means for converting the baseband signal which is a digital signal outputted from said level adjusting means into an analog signal; and gain setting means for calculating a gain set value with which the amplitude value of the baseband signal outputted from said level adjusting means is adjusted to an amplitude value matching a dynamic range of said D/A converting means based on the number of transmission codes which is the number of multiplexed baseband signals, and for notifying said level adjusting means of the gain set value with said control signal.

2. A baseband signal multiplexing circuit for multiplexing a plurality of baseband signals spread with different spread codes into one baseband signal, comprising:

a plurality of baseband filters for respectively limiting bands of the respective baseband signals input thereto;

a plurality of level adjusting means for respectively adjusting amplitude values of the plurality of baseband signals with the bands limited by said respective baseband filters based on a control signal to output the signals;

adding means for adding and code-multiplexing the plurality of baseband signals outputted from said respective level adjusting means to produce one baseband signal;

D/A converting means for converting the baseband signal which is a digital signal outputted from said adding means into an analog signal; and gain setting means for calculating a gain set value with which an amplitude value of the baseband signal outputted from said adding means is adjusted to an amplitude value matching a dynamic range of said D/A converting means based on the number of transmission codes which is the number of multiplexed baseband signals, and for notifying said level adjusting means of the gain set value with said control signal.

3. A baseband signal multiplexing circuit for multiplexing a plurality of baseband signals spread with different spread codes into one baseband signal, comprising:

a plurality of baseband filters for respectively limiting bands of the respective baseband signals input thereto;

a plurality of level adjusting circuits for respectively adjusting amplitude values of the plurality of baseband signals with the bands limited by said respective baseband filters based on a plurality of control signals to output the signals;

an adding circuit adding and code-multiplexing the plurality of baseband signals outputted from said respective level adjusting circuits to produce one baseband signal;

a D/A converting circuit for converting the baseband signal which is a digital signal outputted from said adding circuit into an analog signal;

a gain setting circuit that:

calculates, for respective said level adjusting circuits, a gain set value with which an amplitude value of the baseband signal outputted from said adding circuit is adjusted to an amplitude value matching a dynamic range of said D/A converting circuit, said gain set value is based on the number of transmission codes, which is the number of multiplexed baseband signals, and said gain set value based on interchannel ratio information, said interchannel ratio information specifying an amplitude ratio of the respective baseband signals when the plurality of baseband signals are multiplexed, and notifies said level adjusting circuit of the gain set values with said plurality of control signals.

4. A baseband signal multiplexing circuit for multiplexing a plurality of baseband signals spread with different spread codes into one baseband signal, comprising:

adding means for adding and code-multiplexing the respective baseband signals input thereto to produce one baseband signal;

a baseband filter for limiting a band of the baseband signal produced by said adding means;

a level adjusting means for adjusting an amplitude value of the baseband signal with the band limited by said baseband filter based on a control signal to output the signal;

D/A converting means for converting the baseband signal which is a digital signal outputted from said level adjusting means into an analog signal; and gain setting means for calculating a gain set value with which the amplitude value of the baseband signal outputted from said level adjusting means is adjusted to an amplitude value matching a dynamic range of said D/A converting means based on the number of transmission codes which is the number of multiplexed baseband signals and, for notifying said level adjusting means of the gain set value with said control signal.

5. A baseband signal multiplexing circuit for multiplexing a plurality of baseband signals spread with different spread codes into one baseband signal, comprising:

a plurality of baseband filters for respectively limiting bands of the respective baseband signals input thereto;

a plurality of first level adjusting means for respectively adjusting amplitude values of the plurality of baseband signals with the bands limited by said respective baseband filters based on a plurality of first control signals to output the signals;

adding means for adding and code-multiplexing the plurality of baseband signals outputted from said respective first level adjusting means to produce one baseband signal;

second level adjusting means for adjusting an amplitude value of the baseband signal produced by said adding means based on a second control signal to output the signal;

D/A converting means for converting the baseband signal which is a digital signal outputted from said second level adjusting into an analog signal; and gain setting means for outputting to said respective first level adjusting means the first control signals for adjusting amplitude ratios of the respective baseband signals in accordance with interchannel ratio information for specifying amplitude ratios of the respective baseband signals when the plurality of baseband signals are multiplexed, for calculating a gain set value with which the amplitude value of the baseband signal outputted from said second level adjusting means is adjusted to an amplitude value matching a dynamic range of said D/A converting means based on the number of transmission codes which is the number of multiplexed baseband signals, and for notifying said second level adjusting means of the gain set value with said second control signal.

6. A baseband signal multiplexing circuit for multiplexing a plurality of baseband signals spread with different spread codes into one baseband signal, comprising:

a plurality of first level adjusting means for respectively adjusting amplitude values of said respective baseband signals input thereto based on a plurality of first control signals;

adding means for adding and code-multiplexing the plurality of baseband signals outputted from said respective first level adjusting means to produce one baseband signal;

a baseband filter for limiting a band of the baseband signal produced by said adding means;

second level adjusting means for adjusting an amplitude value of the baseband signal with the band limited by said baseband filter based on a second control signal to output the signal;

D/A converting means for converting the baseband signal which is a digital signal outputted from said second level adjusting means into an analog signal; and gain setting means for outputting to said respective first level adjusting means the first control signals for adjusting an amplitude ratio of the respective baseband signals in accordance with interchannel ratio information for specifying an amplitude ratio of the respective baseband signals when the plurality of baseband signals are multiplexed, for calculating a gain set value with which the amplitude value of the baseband signal outputted from said second level adjusting means is adjusted to an amplitude value matching a dynamic range said D/A converting means based on the number of transmission codes which is the number of multiplexed baseband signals, and for notifying said second level adjusting means of the gain set value with said second control signal.

7. A baseband signal multiplexing circuit for multiplexing a plurality of baseband signals spread with different spread codes into one baseband signal, comprising:
   a plurality of baseband filters respectively limiting bands of the respective baseband signals input thereto, and adjusting amplitude values of the respective baseband signals based on a control signal to output the signals;
   an adder adding and code-multiplexing the plurality of baseband signals with the bands limited by said respective baseband filters to produce one baseband signal;
   a D/A converter converting the baseband signal which is a digital signal outputted from said adder into an analog signal; and
   a gain setting circuit calculating a gain set value with which an amplitude value of the baseband signal outputted from said adding circuit is adjusted to an amplitude value matching a dynamic range of said D/A converter based on the number of transmission codes which the number of multiplexed baseband signals and said gain setting circuit further notifying a level adjusting circuit of the gain set value with said control signal.

8. The baseband signal multiplexing circuit according to claim 7, wherein each of said respective baseband filters includes:
   a plurality of delay elements connected in series, for delaying input signals by a certain time period to output the signals as tap outputs;
   a plurality of coefficient multipliers, for multiplying each of the tap outputs by a filter coefficient of a plurality of preset filter coefficients that is specified by a control signal; and
   an adder for adding a plurality of output signals from said respective coefficient multipliers to output the resulting signal.

9. A method of controlling a transmission level in a baseband signal multiplexing circuit for multiplexing a plurality of baseband signals spread with different spread codes into one baseband signal, said method comprising the steps of:
   calculating a gain set value with which an amplitude value of a multiplexed baseband signal matches a dynamic range in D/A conversion based on the number of transmission codes which is the number of multiplexed baseband signals; and
   adjusting the amplitude value of the code-multiplexed baseband signal prior to the D/A conversion based on the gain set value.

10. A method of controlling a transmission level in a baseband signal multiplexing circuit for multiplexing a plurality of baseband signals spread with different spread codes into one baseband signal, said method comprising the steps of:
   limiting bands of the respective baseband signals input thereto;
   adding and code-multiplexing the plurality of baseband signals with the limited bands to produce one baseband signal;
   calculating a gain set value with which an amplitude value of the code-multiplexed baseband signal matches a dynamic range in D/A conversion based on the number of transmission codes which is the number of multiplexed baseband signals;
   adjusting the amplitude value of the code-multiplexed baseband signal based on the gain set value; and
   D/A converting the baseband signal with the adjusted amplitude value into an analog signal.

11. A method of controlling a transmission level in a baseband signal multiplexing circuit for multiplexing a plurality of baseband signals spread with different spread codes into one baseband signal, said method comprising the steps of:
   limiting bands of the respective baseband signals input thereto;
   calculating a gain set value with which amplitude values of the plurality of baseband signals with the limited bands match a dynamic range in D/A conversion based on the number of transmission codes which is the number of multiplexed baseband signals;
   adjusting the amplitude values of the plurality of baseband signals with the limited bands based on the gain set value;
   adding and code-multiplexing the plurality of baseband signals after the adjustment of the amplitude values to produce one baseband signal; and
   D/A converting the baseband signal after the code-multiplexing into an analog signal.

12. A method of controlling a transmission level in a baseband signal multiplexing circuit for multiplexing a plurality of baseband signals spread with different spread codes into one baseband signal, said method comprising the steps of:
   limiting bands of the respective baseband signals input thereto;
   calculating, for the respective baseband signals, gain set values with which amplitude values of the plurality of baseband signals with the limited bands match a dynamic range in D/A conversion based on the number of transmission codes which is the number of multiplexed baseband signals;
   adjusting the amplitude values of the plurality of baseband signals with the limited bands based on the gain set values;
   adding and code-multiplexing the plurality of baseband signals after the adjustment of the amplitude values to produce one baseband signal; and
   D/A converting the baseband signal after the code-multiplexing into an analog signal.

13. A method of controlling a transmission level in a baseband signal multiplexing circuit for multiplexing a plurality of baseband signals spread with different spread codes into one baseband signal, said method comprising the steps of:
   adding and code-multiplexing the respective baseband signals input thereto to produce one baseband signal;
   limiting a band of the code-multplexed baseband signal;
   calculating a gain set value with which an amplitude value of the baseband signal with the limited band matches a dynamic range in D/A conversion based on the number of transmission codes which is the number of multiplexed baseband signals;
   adjusting the amplitude value of the baseband signal with the limited band based on the gain set value; and
   D/A converting the baseband signal after the adjustment of the amplitude value into an analog signal.

14. A method of controlling a transmission level in a baseband signal multiplexing circuit for multiplexing a plurality of baseband signals spread with different spread codes into one baseband signal, said method comprising:
limiting bands of the respective baseband signals input thereto;
adjusting respective amplitude values of the plurality of baseband signals with the limited bands based on a ratio specifying an amplitude ratio of the respective baseband signals when the plurality of baseband signals are multiplexed;
adding and code-multiplexing the respective baseband signals after the adjustment of the amplitude values to produce one baseband signal;
calculating a gain set value with which an amplitude value of the code-multiplexed baseband signal matches a dynamic range in D/A conversion based on the number of transmission codes which is the number of multiplexed baseband signals;
adjusting the amplitude value of the code-multiplexed baseband signal based on the gain set value; and
D/A converting the baseband signal after the adjustment of the amplitude value based on the gain set value into an analog signal.

15. A method of controlling a transmission level in a baseband signal multiplexing circuit for multiplexing a plurality of baseband signals spread with different spread codes into one baseband signal, said method comprising:
adjusting respective amplitude values of the respective baseband signals input thereto based on a ratio specifying an amplitude ratio of the respective baseband signals when the plurality of baseband signals are multiplexed;
adding and code-multiplexing the respective baseband signals after the adjustment of the amplitude values to produce one baseband signal;
limiting a band of the code-multiplexed baseband signal;
calculating a gain set value with which an amplitude value of the baseband signal with limited band matches a dynamic range in D/A conversion based on the number of transmission codes which is the number of multiplexed baseband signals;
adjusting the amplitude value of the baseband signal with the limited band based on the gain set value; and
D/A converting the baseband signal after the adjustment of the amplitude value based on the gain set value into an analog signal.

16. A method of controlling a transmission level in a baseband signal multiplexing circuit for multiplexing a plurality of baseband signals spread with different spread codes into one baseband signal, said method comprising the steps of:
calculating a gain set value with which amplitude values of the respective baseband signals input thereto match a dynamic range in D/A conversion based on the number of transmission codes which is the number of multiplexed baseband signals;
limiting bands of the input respective baseband signals, and adjusting the amplitude values of the respective baseband signals based on the gain set value by selecting a filter coefficient to be multiplied by each of tap outputs obtained by delaying the input baseband signals by a certain time period;
adding and code-multiplexing the plurality of baseband signals with the limited bands and the adjusted amplitude values to produce one baseband signal; and
converting the code-multiplexed baseband signal which is a digital signal into an analog signal.

* * * * *